US009977884B2

(12) United States Patent
Sarkar et al.

(10) Patent No.: US 9,977,884 B2
(45) Date of Patent: May 22, 2018

(54) AUTHENTICATION SERVER FOR A PROBABILITY-BASED USER AUTHENTICATION SYSTEM AND METHOD

(71) Applicant: Plantronics, Inc., Santa Cruz, CA (US)

(72) Inventors: Shantanu Sarkar, San Jose, CA (US); Timothy P Johnston, Los Gatos, CA (US); Cary Bran, Seattle, WA (US); Joe Burton, Los Gatos, CA (US)

(73) Assignee: Plantronics, Inc., Santa Cruz, CA (US)

( * ) Notice: Subject to any disclaimer, the term of this patent is extended or adjusted under 35 U.S.C. 154(b) by 4 days.

(21) Appl. No.: 14/633,520

(22) Filed: Feb. 27, 2015

(65) Prior Publication Data

US 2016/0253486 A1 Sep. 1, 2016

(51) Int. Cl.
*H04L 29/06* (2006.01)
*G06F 21/31* (2013.01)
*G06F 21/55* (2013.01)

(52) U.S. Cl.
CPC .......... *G06F 21/316* (2013.01); *G06F 21/552* (2013.01); *G06F 2221/2111* (2013.01)

(58) Field of Classification Search
CPC ........ G06F 21/31; G06F 21/316; G06F 21/30; G06F 21/552; G06F 2221/2111
USPC .............................. 726/7, 2, 3, 4, 26, 27, 28
See application file for complete search history.

(56) References Cited

U.S. PATENT DOCUMENTS

| 6,104,922 A * | 8/2000 | Baumann ........... H04B 7/18567 455/410 |
| 6,655,585 B2 * | 12/2003 | Shinn ..................... A61B 5/117 235/382 |
| 7,917,768 B2 | 3/2011 | Kahn et al. |
| 7,986,816 B1 * | 7/2011 | Hoanca .............. G06K 9/00597 382/115 |
| 8,887,259 B1 * | 11/2014 | Harding .............. G06F 21/6254 713/185 |
| 9,384,654 B1 * | 7/2016 | Chillappa .............. G08B 25/10 |
| 2003/0025603 A1 | 2/2003 | Smith |
| 2008/0076572 A1 | 3/2008 | Nguyen et al. |
| 2008/0155651 A1 * | 6/2008 | Wasmund ............. G06F 21/316 726/2 |
| 2008/0275819 A1 * | 11/2008 | Rifai ...................... G06Q 20/32 705/44 |
| 2009/0041313 A1 | 2/2009 | Brown |

(Continued)

*Primary Examiner* — Sarah Su
(74) *Attorney, Agent, or Firm* — Thomas S. Dienwiebel

(57) ABSTRACT

An authentication server, an application device and a probability-based user authentication system and method are disclosed. To simplify authentication while keeping a high level of security, the authentication server comprises at least an authentication probability evaluation module for determining a probability of requestor identification. The authentication server is configured to at least receive an authentication request from an authenticator, said authentication request comprises at least user identification data. The authentication probability evaluation module is configured upon reception of said user identification data to receive user behavior information, corresponding to the received user identification data from a user information database; and to determine a user probability value by comparing at least said user behavior information with authenticator application data. The requestor is authenticated in dependence of said determined user probability value.

22 Claims, 7 Drawing Sheets

(56) References Cited

U.S. PATENT DOCUMENTS

| | | | |
|---|---|---|---|
| 2009/0140841 A1* | 6/2009 | Meyer | G01S 5/0252 340/10.41 |
| 2009/0249478 A1 | 10/2009 | Rosener et al. | |
| 2010/0042848 A1 | 2/2010 | Rosener | |
| 2010/0115610 A1* | 5/2010 | Tredoux | H04L 9/3231 726/19 |
| 2011/0016534 A1* | 1/2011 | Jakobsson | G06F 21/316 726/28 |
| 2013/0133054 A1* | 5/2013 | Davis | G06F 21/316 726/7 |
| 2014/0241593 A1* | 8/2014 | Koseki | G06K 9/00221 382/118 |
| 2014/0333414 A1* | 11/2014 | Kursun | G06K 9/00926 340/5.82 |
| 2015/0220715 A1* | 8/2015 | Kim | G06F 21/32 726/18 |
| 2016/0255459 A1* | 9/2016 | Sarkar | H04W 4/008 |
| 2016/0308884 A1* | 10/2016 | Kent | G06K 9/6277 |

\* cited by examiner

AUTHENTICATION SERVER FOR A PROBABILITY-BASED USER AUTHENTICATION SYSTEM AND METHOD

CROSS-REFERENCE TO RELATED APPLICATIONS

The contents of utility patent publication US 2009/0249478 A1 "USER AUTHENTICATION SYSTEM AND METHOD", filed on Mar. 31, 2008 are incorporated herein by reference for all purposes to the extent that such contents is not inconsistent with the present application.

TECHNICAL FIELD

The present invention relates to the field of computer science and more particularly to user authentication for access of a user to resources, including, e.g., information, computing resources, or restricted building areas.

BACKGROUND

For the purposes of the following description, authentication typically is understood as the act of proving to a computer-based system (known as an authenticator) that a user is who she or he claims to be. User authentication is often based on providing user credentials in terms of three factors:
- something you know (e.g., a password),
- something you have (e.g., an ATM card), and
- something you are (e.g., a fingerprint).

One or more of these factors are typically verified to authenticate a user. For example, a computer user is required to authenticate himself, such as logging into his computer account, retrieving e-mail from servers, accessing certain files, databases, networks, web sites, etc. In banking applications, a bank account holder is required to provide his automatic teller machine (ATM) card as a first factor and enter a personal identification number (PIN) as a second factor in order to access an automated teller machine to conduct a banking transaction.

While in the past, users in general had to authenticate themselves, e.g., with the above factors, in a limited number of situations; the number of necessary authentications rises continuously. In addition to the above examples, computer users today have to present login/password combinations, and thus to authenticate, when accessing various web sites or services for business or personal purposes. In addition, it is increasingly necessary for someone to authenticate during further everyday tasks, e.g., when accessing security-restricted areas, including the person's workplace, gym, apartment building, etc.; when using transportation; or when shopping and subsequently paying for groceries.

Due to the high number of necessary authentications in everyday life, the latter became a quite tedious task, not only due to the effort required with the authentication processes, but also due to the necessity to safely keep a multitude of user credentials. At least in part due to the effort involved, some users, e.g., tend to choose the same credentials, such as login information, for multiple applications or choose very simple passwords, which then in turn lead to a decreased security of these applications.

Accordingly, an object exists to provide simplified authentication while keeping a high level of security.

SUMMARY

The following summary is provided to facilitate an understanding of some of the innovative features unique to the present invention and is not intended to be a full description. A full appreciation of the various aspects of the invention can be gained by taking the entire specification, claims, drawings, and abstract as a whole.

According to one aspect of the present invention, an authentication server for a probability-based user authentication system is provided.

In the first aspect, the authentication server comprises at least an authentication probability evaluation module for determining a probability of requestor identification. The authentication server according to this example is configured to receive an authentication request from an authenticator, wherein said authentication request comprises at least user identification data. The authentication probability evaluation module is configured to receive said user identification data, receive user behavior information from a user information database, wherein said user behavior information corresponds to the received user identification data, and to determine a user probability value by comparing at least said user behavior information with authenticator application data. The requestor according to the present example is subsequently authenticated in dependence of the determined user probability value.

The basic idea of one or more embodiments of the present invention is to provide an improved authentication of a requestor, i.e. a user that requests authentication, based on a determination of a probability or likelihood that the requestor is in fact the user who she or he claims to be. The present invention thus provides a convenient and secure way of authentication, which may be used in a variety of applications, in particular, but not limited, in security related applications.

In the following explanation of the present invention according to the embodiments described, the terms "connected to" or "connected with" are used to indicate a data connection/transmission link between at least two components, devices, units, or modules. Such a connection may be direct between the respective components, devices, units, or modules or indirect, i.e. over intermediate components, devices, units, or modules. The connection may be permanent or temporary; wireless or conductor based.

As discussed in the preceding, the present first aspect refers to an authentication server for use in a probability-based user authentication system. The authentication server may be of any suitable type. The authentication server may in one example be formed integrally with a further component or device of the system or in another example provided as a "stand-alone" device or unit. The authentication server may, e.g., be formed at least in part by software programming and/or by logic circuitry. In one example, the authentication server comprises a computing unit having at least a processor with a suitable programming to provide the functionality of at least some of the modules described herein.

The authentication server according to the present aspect comprises at least an authentication probability evaluation module for determining a probability of requestor identification, as discussed in the preceding. In this context, the term "probability of requestor identification" refers to the probability that a current user of an authenticator, which user is also referred to as "requestor", is who she or he claims to be, namely an authorized user. The authorized user in this context may be a user whom is granted access to restricted resources, such as to a device, to information, or to access-restricted locations. In some applications, the authorized user may be associated with a predefined user ID and/or a user account.

The authentication server according to the present aspect is configured to receive an authentication request from an authenticator. The authentication request comprises at least user identification data, but may certainly comprise additional information/data. The authentication server may in one example be configured to receive the authentication request over a LAN/WAN network, e.g., in case the authenticator is present in a remote application device. In another example, the authentication server may be coupled directly with said authenticator, e.g., in case the authentication server is provided as a subsystem of the authenticator.

It is noted, that the term "authenticator" and "authenticator module" are used interchangeably in the present description. The authenticator may be of any suitable type for at least sending said authentication request and, e.g., receive a response, as discussed in the following. The authenticator may be associated with an application device, such as in particular, but not limited to, a computing device, a smart phone, a smart watch, a wearable device, a machine, a vehicle, a security access terminal, an automatic teller machine, a payment terminal, a security badge, or a website/web server. While the authenticator in one example is formed integrally with the application device; in another example, the authenticator is provided remotely from the application device, but connected therewith.

The authentication probability evaluation module according to the present aspect upon reception of said user identification data is configured to receive/retrieve user behavior information, corresponding to the received user identification data, from a user information database and determine a user probability value by comparing at least said user behavior information with authenticator application data.

In dependence of the determined user probability value, the respective requestor is subsequently authenticated or not authenticated as the authorized user that she or he claims to be.

The operation of the authentication server may in one embodiment at least in part be conducted automatically, providing a comfortable and secure user authentication.

According to the preceding, the authentication probability evaluation module in one embodiment conducts at least two steps in case an authentication request is received by the authentication server from an authenticator. First, user behavior information is received, which corresponds to the received user identification data, comprised in said authentication request. Second, the received user identification data is compared with at least said authenticator application data.

The user identification data in this context comprises at least information, allowing to determine a corresponding record of user behavior information from the user information database. For example, the user identification data may comprise a specific user ID or a user account, associated with the authorized user for which authentication is requested. The respective record of user behavior information in this example is associated with said user ID/account, allowing to find the respective record of user behavior information of the corresponding user in the user information database.

The user behavior information comprises at least information allowing to determine prior or past behavior of the authorized user for which the authentication is requested, e.g., collected automatically from various sensors, detectors, or I/O devices. The records of user behavior information may comprise one or more prior probability datasets, describing a predefined category of past user behavior, such as prior user locations correlated with time or day, prior user keystroke patterns, prior user walking pace, or any other detectable user behavior information. Each prior probability dataset may comprise one or more entries of corresponding user behavior information.

In one non-limiting example, the user behavior information may comprise entries of prior user locations and time, corresponding to typical routines in the respective authorized user's daily life. Accordingly, the user behavior information may correspond to behavior patterns of the authorized user. Examples of user behavior information are discussed in more detail in the following.

The determined user behavior information is compared at least with the authenticator application data to determine said user probability value. The authenticator application data in this context may comprise any information, allowing a comparison with the prior behavior of the authorized user for which the authentication is requested, comprised in the user behavior information. Examples of the authenticator application data are discussed in more detail in the following.

In one example, the authenticator application data is comprised in the authentication request. In another example, the authenticator application data is provided to the authentication probability evaluation module by the authenticator in a transmission, separate from the authentication request.

In the above example where the user behavior information comprises entries of prior user locations and time, the authenticator application data may in one example comprise information, allowing to determine the location of the application device and the time of the authentication request, so that the user probability value may be determined by comparing the entries of prior user locations and time of the user behavior information with the location of the application device and the time of the authentication request.

If, e.g., the user behavior information shows that on weekdays, the respective authorized user typically is at a certain location at a given time, the time of the authentication request matches the given time, and the location of the application device is close to the stored location, the probability that the requestor is in fact the authorized user that he claims to be is relatively high, resulting in a high user probability value.

The user probability value may be determined by the authentication probability evaluation module according to any suitable method. For example, the user probability value may be determined from a likelihood function. The likelihood function in one embodiment is of "non-Bayesian" type, i.e. assuming that all stored entries of user behavior information are independent. In another embodiment, the likelihood function is of "Bayesian" type with or without a Markov chain. Here, it is assumed that the stored entries of user behavior information are not independent. In all aforesaid embodiments, the user behavior information may correspond to an informative prior.

The user probability value in this context may be of any type of analog or digital representation, e.g., a numeric representation, corresponding to the probability that the requestor is the authorized user for which authentication is requested, i.e. the authorized user corresponding to the user identification data.

It should be noted that the user behavior information may be provided in a data format that is directly comparable with the authenticator application data. Otherwise, a data conversion module may be provided that converts one or both of the user behavior information and the authenticator application data to allow a comparison thereof by the authentication probability evaluation module.

The user information database may be of any suitable type and may in one example be comprised in a suitable memory, such as RAM, ROM, flash memory, a hard drive, a solid state drive, etc. In another alternative or additional example, the user information database is comprised in the authentication server. In another example, the user information database is provided in a remote server, e.g., connected with said authentication server over a LAN/WAN connection.

As discussed in the preceding, the authentication server comprises at least the authentication probability evaluation module. Certainly, the authentication server may in additional embodiments comprise one or more further components, devices, modules, or units. For example, the authentication server may comprise a housing, a battery or other power supply, and/or one or more user I/O interfaces, such as one or more of a keyboard and a display. The authentication server may also comprise one or more (network) communication interfaces for conductor based or wireless operation, such as an Ethernet interface, a Wi-Fi interface for communication according to one or more of the IEEE 802.11 standards, a cellular communication interface adapted for, e.g., one of the GSM, EV-DO, and/or LTE standards, a Bluetooth communication interface, or an interface for communication according to the IEEE 802.15 group of standards. Some further exemplary additional modules and components are described in further detail in the following description.

As mentioned in the preceding, the respective requestor according to the present aspect is authenticated or not authenticated as the authorized user in dependence of the determined user probability value.

There are many protocols for authentication in existence and/or being developed. Examples are OpenID, SAML, and Kerberos, which may be used to authenticate the requestor.

In one example, authentication is conducted by the authenticator. In this example, the authentication server is configured to provide authentication information comprising the user probability value to the authenticator. The authenticator may, in an additional example, upon reception of the user probability value, compare the user probability value with a predefined application threshold value and in case the user probability value corresponds to said application threshold, authenticate the requestor.

In an alternative or additional embodiment, the authenticator in case the user probability value corresponds to said application threshold provides user authentication information, such as a binary value corresponding to one of "authenticated" and "not authenticated" conditions, to said authentication server, upon which the authentication server authenticates the requestor, e.g., by sending digital credentials back to the authenticator.

According to another embodiment, the authentication server further comprises an authentication module, configured to receive said user probability value from said authentication probability evaluation module, to receive an application threshold value, and to compare the received application threshold value with said user probability value. In this embodiment, user authentication information is transmitted to the authenticator by the authentication module in case the application threshold value corresponds to the user probability value.

The application threshold value in this context may refer to any type of analog or digital representation, e.g. a numeric representation, corresponding to an authority level that needs to be met to authenticate the requestor. In one example, the application threshold value refers to a minimum authority level that needs to be met for a successful authentication for the respective application. Certainly, different application devices/authenticators may require different levels of user authentication, corresponding to different application threshold values. For example, access to a bank vault, i.e. a first application device with a first authenticator, may require a higher level of authentication than the purchase of a cup of coffee, i.e. a second application device with a second authenticator.

It should be noted that the application threshold value may be provided in a data format that is directly comparable with the user probability value. Otherwise, a probability data conversion module may be provided, that converts one or both of the application threshold value and the user probability value to allow a comparison thereof by the authentication module.

The authentication module in one example is connected with said authentication probability evaluation module. In another alternative or additional example, the application threshold value is provided to the authentication module by the authenticator or the application device, e.g., in said authentication request. In another example, the application threshold value is derived from an application threshold database.

The user authentication information, discussed in the preceding, may be of any suitable type. For example, the user authentication information may comprise data, corresponding to an "authenticated" condition. In another embodiment and in case of an authentication by the authentication server, the authentication server upon successful authentication may be configured to provide digital credentials of the authorized user to the authenticator. In some cases (Kerberos for example), a software "user agent" retains the digital credentials (called tickets) and provides them to the authenticator as needed. The user authentication information may in one further additional or alternative embodiment comprise the user probability value.

In case the application threshold value does not correspond to said user probability value and in one example, the authentication server does not provide a reply to the authenticator. In another example, the authentication server in this case transmits an "authentication rejected" message, corresponding to the above "not authenticated" condition, to the authenticator. In one example, the "authentication rejected" message comprises information corresponding to the time passed since the last successful user authentication.

According to another embodiment, the authentication module is configured to transmit said user authentication information to said authenticator in case said user probability value is equal to or higher than said application threshold value. The present embodiment allows a quick determination of whether the current user probability value matches the minimum authority level of the respective application.

As discussed in the preceding, the authenticator application data in the present context may comprise any information, allowing a comparison with the prior behavior of the authorized user for which the authentication is requested, comprised in the user behavior information.

In one embodiment, the authenticator application data comprises one or more application parameters from the group of application parameters of: application location data, authentication time data, application proximity data, and application I/O pattern data.

The term "application location data" in the present context corresponds to the physical location of the application device. This may allow, for example to match the location of the application device with prior user spatiotemporal data of the user behavior information to determine the user probability value.

The application location data may correspond to an absolute location, e.g., longitude and latitude of the application device or to a relative location, e.g., a given distance from a reference point. The application location data of the authenticator application data may comprise information about the absolute location or an identifier that can be used by the authentication probability evaluation module to look up the respective location of the application device, such as from a database or directory. For example, the application location data may comprise an application ID, a network address (MAC/IP), or another unique or quasi-unique identifier that allows to identify the respective application device.

The term "authentication time data" in the present context corresponds to a specific time of the day, week, month, or year, or other information that relates to time and/or date of the request for authentication by the requestor. The authentication time data may be compared in one example with prior user spatiotemporal data of the user behavior information.

For example, in case the authorized user typically requests authentication to enter the front door at her or his workplace at a given time each workday, such information comprised in said user behavior information allows to determine the user probability value by comparing the "typical time" of the authentication request by the authorized user with the time of the actual authentication request of the present requestor. In this example, a higher deviation of these times leads to a reduced probability that the requestor is the authorized user, while an exact match leads to a higher probability that the requestor is in fact the authorized user. The user probability value then is set accordingly.

The term "application proximity data" corresponds to the proximity of the application device to one or more further devices, such as further application devices, e.g., a device known to be associated with the authorized user, such as the authorized user's smart phone, smart watch, laptop computer, tablet computer, or wearable device. The application proximity data may also correspond to the proximity of the application device to a device known to associated with someone, who in turn is related to the authorized user, e.g., a family member, friend, or coworker, allowing to "vouch" for the respective requestor.

For example, the application device may comprise a Bluetooth or Wi-Fi interface, allowing to scan for devices in its vicinity. In this case, the application device may determine, that during the time of the authentication request by the requestor, the smart phone and a wearable smart watch of the authorized user were in the direct proximity of the application device, which may then lead to an increased probability that the requestor is in fact the authorized user and a correspondingly increased user probability value. Furthermore in this example, the additional proximity of the smart phone of the authorized user's wife may increase the probability and the user probability value further.

As discussed in the preceding, the authenticator application data may also comprise application I/O pattern data. The I/O pattern data may be obtained from a corresponding I/O interface or sensor formed integrally with the application device or remotely thereof. In the latter case, the I/O interface or sensor is at least temporarily connected with the application device.

In one embodiment, the I/O pattern data comprises keystroke information of a connected keypad, keyboard, or mouse, allowing to determine characteristics of the keyboard entry, such as the timing between the entry of single letters or numbers, cadence, key press duration, etc. For example and in case the application device is a computer, the I/O pattern data may comprise timing characteristics of the entry of the user name for which authentication is requested and/or a password. The keystroke information may in one embodiment comprise a mean or average of a plurality of keystrokes.

In another embodiment, the I/O pattern data comprises accelerometer characteristics of a connected accelerometer. The accelerometer characteristics may, e.g., be used to determine a specific walking pace of the user.

In another embodiment, the I/O pattern data comprises don and doff characteristics of a body worn device, obtained from a corresponding DON/DOFF detector, as discussed in patent application publication US 2009/0249478 A1, entitled "USER AUTHENTICATION SYSTEM AND METHOD", mentioned in the preceding.

In another embodiment, the I/O pattern data comprises voice characteristics or other biometric information/data streams, such as for example heart rate, walking gait and/or head motion of the authorized user. Certainly, the I/O pattern data may in one embodiment comprise a combination of the above.

According to another additional or alternative embodiment, the user behavior information comprises one or more prior probability datasets from the group of prior probability datasets of: prior user spatiotemporal data, prior user authentication data, prior user proximity data, and prior user I/O pattern data. Each prior probability dataset may comprise one or more entries of the corresponding group, e.g., one or more I/O pattern related entries.

In this context, the term "prior user spatiotemporal data" corresponds to stored prior physical locations of the authorized user at a given time and/or date. The user spatiotemporal data may, e.g., be determined from a corresponding training module of a smart phone or smart watch of the authorized user or entered manually. The prior user spatiotemporal data may correspond to an absolute location, e.g., longitude and latitude, or to a relative location, e.g., a given distance from a reference point, such as "work" or "home", as explained in the preceding with regard to the application location data.

The term "prior user authentication data" in this context corresponds to stored information on prior user authentication attempts and in particular on successful user authentication attempts. Such information may comprise date/time and/or location data of a user authentication attempt and/or devices in proximity to the application device during authentication.

The term "prior user proximity data" in this context corresponds to stored information on further devices that are known to be associated with the authorized user, as discussed in the preceding with reference to the application proximity data. Correspondingly, "prior user I/O pattern data" in the present context may correspond to stored I/O pattern data of the authorized user. The I/O pattern data may be of any suitable type, as explained in the preceding with reference to the application I/O pattern data.

According to a further embodiment, the authenticator application data comprises at least application location data. The user behavior information comprises at least prior user spatiotemporal data. The authentication probability evaluation module in this case is configured to determine said user probability value in dependence of whether said application location data corresponds to said prior user spatiotemporal data.

The present embodiment allows to determine, whether the location of the application and thus the requestor corresponds to typical prior user behavior or not. For example, in case the application location data corresponds to the location of an automatic teller machine (ATM) that is known from the prior user spatiotemporal data the authorized user, this fact may result in a relatively high user probability value, since it appears that this ATM was used by the authorized user before. On the other hand, if the location data corresponds to a not known, i.e., unexpected, suspicious, or unusual location, this fact may lead to a reduced user probability value.

In another alternative or additional embodiment, the authenticator application data comprises at least application proximity data. The user behavior information comprises at least prior user proximity data. The authentication probability evaluation module in this case is configured to determine said user probability value in dependence of whether said application proximity data corresponds to the prior user proximity data.

For example, if it is known from the user behavior information that the user typically carries his smart phone and his headset when he tries to authenticate for accessing the main entry at his workplace, a lack of one or both devices during the current authentication request may reduce the probability that the requestor is the authorized user and thus the user probability value.

According to a further alternative or additional embodiment, the authenticator application data comprises at least application I/O pattern data. The user behavior information comprises at least prior user I/O pattern data. The authentication probability evaluation module in this case is configured to determine said user probability value in dependence of whether said application I/O pattern data corresponds to the prior user I/O pattern data.

As discussed in the preceding, the I/O pattern data may comprise keystroke information. The determination of the user probability value in this case may be based on comparing the (observed) keystroke information of said application I/O pattern data with the (known) keystroke information of the prior user I/O pattern data.

In one embodiment, the prior user I/O pattern data comprises a mean or average value of keystroke information, e.g., a plurality of keystrokes. In another embodiment, the determination of said user probability value comprises the determination of a mean or average value of a plurality of keystroke entries of said prior user I/O pattern data. In both cases, the mean value may be based on all corresponding keystrokes previously detected or a predefined number of such keystrokes, such as the last 100 detected keystrokes of the authorized user.

In one additional embodiment, the authentication probability evaluation module is configured to determine said user probability value by determining whether the (observed) keystroke information of said application I/O pattern data is within the standard deviation of the (known) mean or average value of said keystroke information. In this embodiment, a high user probability value results if the (observed) keystroke information of said application I/O pattern data is within the standard deviation. Otherwise, and in another embodiment, a low user probability value is determined, such as 0.

For example, measured over 50 successful attempts, a user types the second letter of his username on an average, 151 ms, after he types the first letter. Considering a standard deviation of his typing the second letter is 5 ms, a match between the would be given in case a requestor types the second letter of the username between 146 and 156 ms after the first letter. This process may be repeated for every letter in the username. Thus, for an 8-character username, 7 tests are performed and the requestor's typing should be within 2 standard deviations of the 50-attempt average.

In a further alternative or additional embodiment, said authenticator application data comprises at least authentication time data and said user behavior information comprises at least prior user authentication data. According to this embodiment, the authentication probability evaluation module is configured to determine said user probability value in dependence of the time passed since a prior user authentication. For example, a recent successful authentication may provide an increased user probability value, while a long time since the last successful authentication may provide a decreased determined user probability value.

In another embodiment and in case the requestor is authenticated, prior user authentication data is stored in the user information database, comprising at least authentication time data, i.e. the date/time of the successful authentication as user behavior information for future authentication purposes.

Certainly, in one further embodiment, the authentication probability evaluation module may be configured to determine said user probability value by comparing a plurality of different application parameters, comprised in said authenticator application data, with the corresponding prior probability datasets, comprised in said user information database.

This embodiment provides a particularly accurate determination of the user probability value by comparing a plurality of "inputs", i.e. the application parameters, with the corresponding prior probability datasets of the user behavior information. For example and according to the present embodiment, a highly matching keystroke pattern may outweigh a new, unknown location of the application device and thus result in a relatively high user probability value, even in case the location of the authentication request is unknown.

It will be apparent that the higher the number of application parameters or "inputs" and correspondingly the number of prior probability datasets, the more accurate the determination of the likelihood of requestor information, and thus the user probability value, may be.

In an additional embodiment, the authentication probability evaluation module is configured to calculate the user probability value with a predefined weight function from said plurality of application parameters and said plurality of prior probability datasets. The present embodiment allows predefining the influence or weight of each application data parameter in the determination of the user probability value according to the respective security protocol or application.

According to another embodiment, the authentication module is configured to receive/retrieve said application threshold value from an application threshold database. According to the present embodiment, the application threshold database comprises a plurality of application threshold values, wherein each application threshold value is correlated with at least one of a plurality of authenticators.

The present embodiment increases the versatility in case of an authentication system having a plurality of authenticators and thus a plurality of application devices. In particular, the present embodiment provides that application devices may have application threshold values that differ from each other. For example, access to a bank vault may require a higher application threshold value than appropriate for the purchase of a cup of coffee. The application devices/authenticators may accordingly be configured to "register" with the application threshold database during an initialization procedure and subsequently upload and store the respectively required application threshold value. The application devices/authenticators may additionally or alternatively be configured to update the stored application threshold value depending on internal or external factors, such as a current crime level.

The application threshold database may be of any suitable type and may be comprised in a suitable memory, such as RAM, ROM, flash memory, a hard drive, a solid state drive, etc. In one example, the application threshold database is comprised in the authentication server. In another example, the application threshold database is provided in a remote server or other device, e.g., connected with said authentication server over a LAN/WAN connection.

According to a second aspect, an application device for a probability-based user authentication system is provided. The application device comprises an authenticator to authenticate a requestor; wherein said authenticator is configured to provide an authentication request to an authentication server, comprising at least user identification information. The authenticator is further configured to receive authentication information from said authentication server; wherein the requestor is authenticated in dependence of whether said authentication information is received.

The application device according to the present second aspect may be of any suitable type, such as in particular, but not limited to, a computing device, a smart phone, a smart watch, a wearable device, a machine, a vehicle, a security access terminal, an automatic teller machine, a payment terminal, a security badge, or a website/web server.

The application device in one example may comprise a corresponding positioning module for obtaining application location data. The positioning module may for example comprise a satellite positioning receiver, adapted for use with a satellite positioning system, such as GPS, GLONASS, GALILEO, IRNSS and/or BEIDOU/COMPASS. The positioning module may also be configured for assisted satellite positioning, such as in "assisted GPS (A-GPS)". In an alternative example, the application location data is predefined in said application device, or said authenticator.

According to a further embodiment, the application device further comprises a user interface, wherein said authenticator is configured to query user credentials in case no authentication information is received from said authentication server.

The user interface may be of any suitable type, such as a keyboard, keypad, mouse, touch screen, microphone, or a fingerprint scanner and serves to obtain additional user credentials in case the authentication fails. For example, the user probability value determined by the authentication server may be lower than the respective application threshold value of the application device. In this case, further user credentials of any type, e.g., a password, PIN, a social security number, a voiceprint, and/or fingerprint may be required to authenticate the requestor as the authorized user.

In one additional embodiment and in case the authentication server is configured to send the previously discussed authentication rejected message to said authenticator, where said authentication rejected message comprises information corresponding to the time passed since the last successful user authentication, the authenticator may be additionally configured to determine the type of the queried user credentials depending on the time passed since the last successful user authentication. In particular, the authenticator may be configured to query user credentials of an increasing trust level with increasing time passed since the last successful authentication.

For example, in case only a limited time passed since the last successful authentication, the authenticator may query only the last four digits of the authorized user's social security number, while in case a longer time passed, a fingerprint scan may be queried.

With regard to further embodiments of the above mentioned application device according to the present aspect, reference is made to the preceding description of the first aspect of the invention. The authentication server and/or the application device may in further embodiments be configured according to one or more of the embodiments, described in the preceding, e.g., with reference to the first and/or second aspects.

In a further non-limiting aspect, a probability based user authentication system is provided, comprising at least an authentication server and an application device. Both, the authentication server and the application device may be setup according to one or more of the embodiments, described above with reference to the first and second aspects. Certainly, the user authentication system may comprise a plurality of authentication servers and/or application devices.

In another non-limiting aspect, a computer-implemented method of probability based user authentication with an authentication server is provided. According to the method, an authentication request is received from an authenticator, said authentication request comprising at least user identification data. Subsequently, user behavior information, corresponding to the received user identification data, is received from a user information database. A user probability value is determined by comparing at least said user behavior information with authenticator application data. A requestor is authenticated in dependence of said determined user probability value.

A computer program or module may be provided to enable an authentication server and/or a processor to carry out the method discussed above. The computer program may be contained on a computer readable medium, such as a solid state, magnetic or optical storage device.

These and other aspects of the invention will be apparent from and elucidated with reference to the embodiments described hereinafter.

DETAILED DESCRIPTION OF PREFERRED EMBODIMENTS

Figure 1:
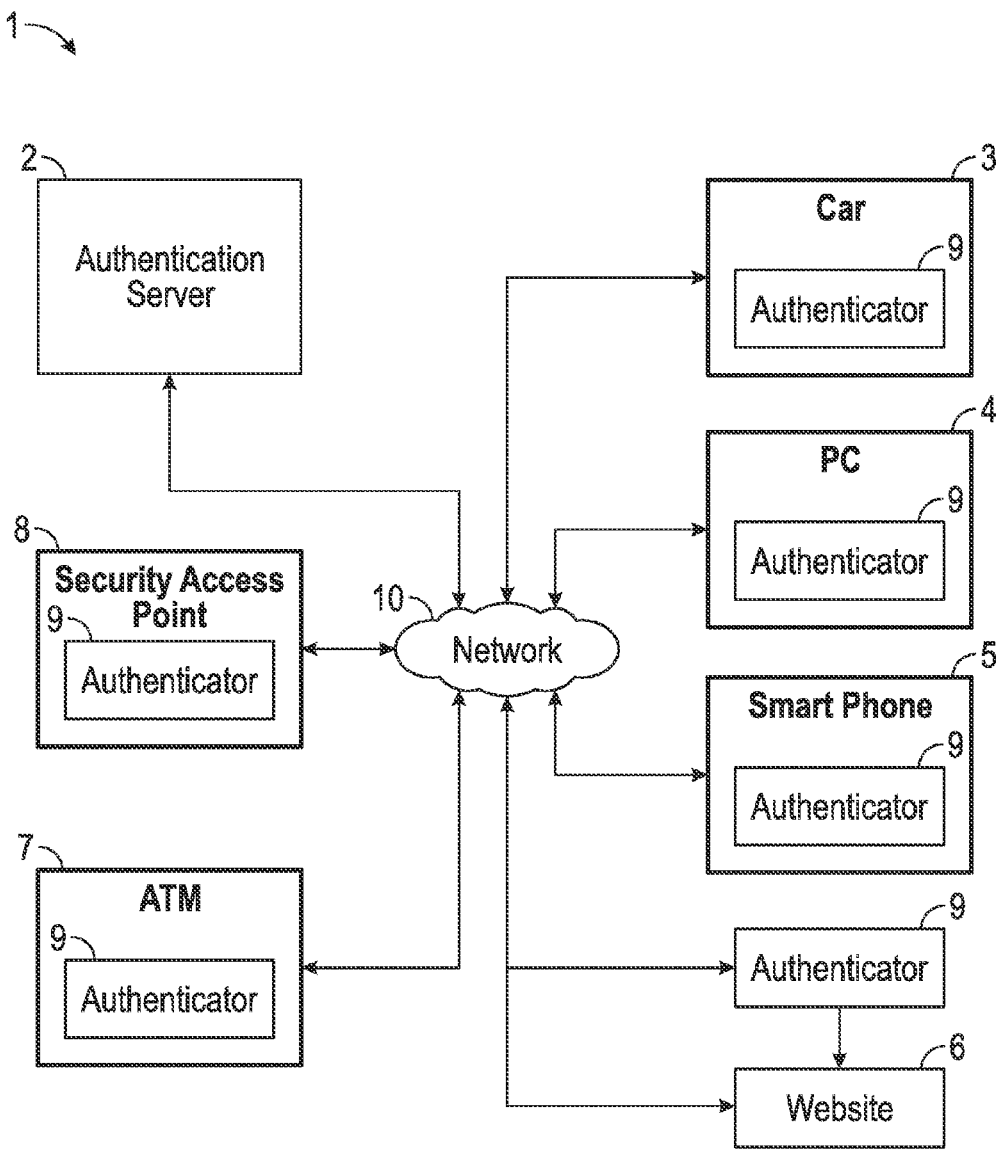
FIG. 1 shows an embodiment of a probability-based user authentication system with an authentication server and multiple application devices in a schematic block diagram.

Technical features described in this application can be used to construct various embodiments of a probability-based user authentication system, an authentication server, and an application device, according to the description herein.

In the field of computer science and in particular in the field of user authentication for access to resources, it has been identified that due to the high number of necessary authentications, the latter became a quite tedious task, not only due to the effort required with the authentication processes, but also due to the necessity to safely keep a multitude of user credentials. At least in part due to the effort involved, some users, e.g., for websites on the Internet tend to choose the same user credentials for multiple logins or choose very simple passwords, which then in turn leads to a decreased security of these applications.

In one approach, the present inventors have recognized that an authentication server and a corresponding authentication method/procedure may be provided based on a determination of a likelihood or probability that a requestor, i.e. a user that requests authentication, is in fact who the requestor claims to be.

By providing an authentication server having at least an authentication probability evaluation module, as discussed in exemplary embodiments, convenience and security of an authentication procedure is improved.

Reference will now be made to the drawings in which the various elements of embodiments will be given numerical designations and in which embodiments will be discussed so as to enable one skilled in the art to make and use the invention.

Specific reference to components, devices, units, modules, process steps, and other elements are not intended to be limiting. Further, it is understood that like parts bear the same reference numerals, when referring to alternate figures. It is furthermore noted that the figures are schematic and provided for guidance to the skilled reader and are not necessarily drawn to scale. Rather, the various drawing scales, aspect ratios, and numbers of components shown in the figures may be purposely distorted to make certain features or relationships easier to understand.

In the current explanation of the preferred embodiments, the terms "connected to" or "connected with" are used to indicate a data connection/transmission link between at least two components, devices, units, or modules. Such connection may be direct between the respective components, devices, units, or modules or indirect, i.e. over intermediate components, devices, units, or modules. The connection may be permanent or temporary; wireless or conductor based.

For example, a connection may be provided over a WAN (wide area network), LAN (local area network), and/or PAN (personal area network), comprising, e.g., the Internet, Ethernet networks, cellular networks, Bluetooth networks, and/or Wi-Fi networks using a suitable communications protocol.

FIG. 1 of the enclosed drawings shows an authentication system 1, having an authentication server 2 and multiple application devices 3-8, connected with the authentication system 1 over a network 10, which according to this example is a TCP/IP network having transmission links established over Ethernet and Wi-Fi connections.

The application devices 3-8 according to the embodiment of FIG. 1 correspond to typical applications, where an authentication may be necessary to access resources of these applications. For example, it should be apparent that access to car 3, personal computer 4, or smart phone 5 should be restricted to persons, who are authorized to use the respective car 3, personal computer 4, or smart phone 5, respectively. Correspondingly, access to restricted premises may be controlled using a security access point 8, such as access to a laboratory or a bank vault. Further applications, where the access to resources may be restricted comprise banking applications, such as an automatic teller machine (ATM, 7). Another application includes access to a restricted website 6, e.g., providing access to a specific user account including credit card data for payment purposes on a shopping website.

In all of the above applications, as well as in a variety of further applications, the person requesting to be granted access, in this context also referred to as "requestor", may present user identification data, such as a specific user ID or a user account of a user, who is authorized to access the respective application, in this context referred to as the "authorized user". This procedure is also referred to as "requesting authentication".

For example, in case of the mentioned personal computer 4, the user identification data may comprise the login name of an authorized user. In the example of ATM 7, the user identification data may comprise a credit or debit card number, or a bank account number together with a routing number, as is typically presented by swiping a magnetic stripe card in a corresponding card reader (not shown) of ATM 7.

According to the embodiment of FIG. 1, each application device 3-8 comprises an authenticator 9, also referred to as "authenticator module". The authenticator 9 in this embodiment receives the user identification data from the requestor and sends an authentication request to authentication server 2 over network 10. As can be seen from FIG. 1, the authenticator 9 may be formed integrally with the respective application device, or be formed externally thereof, such as in case of website 6. Certainly, even in the latter case, the authenticator 9 is connected with the respective application device, which connection can be direct or indirect, e.g., using network 10.

Figure 2:
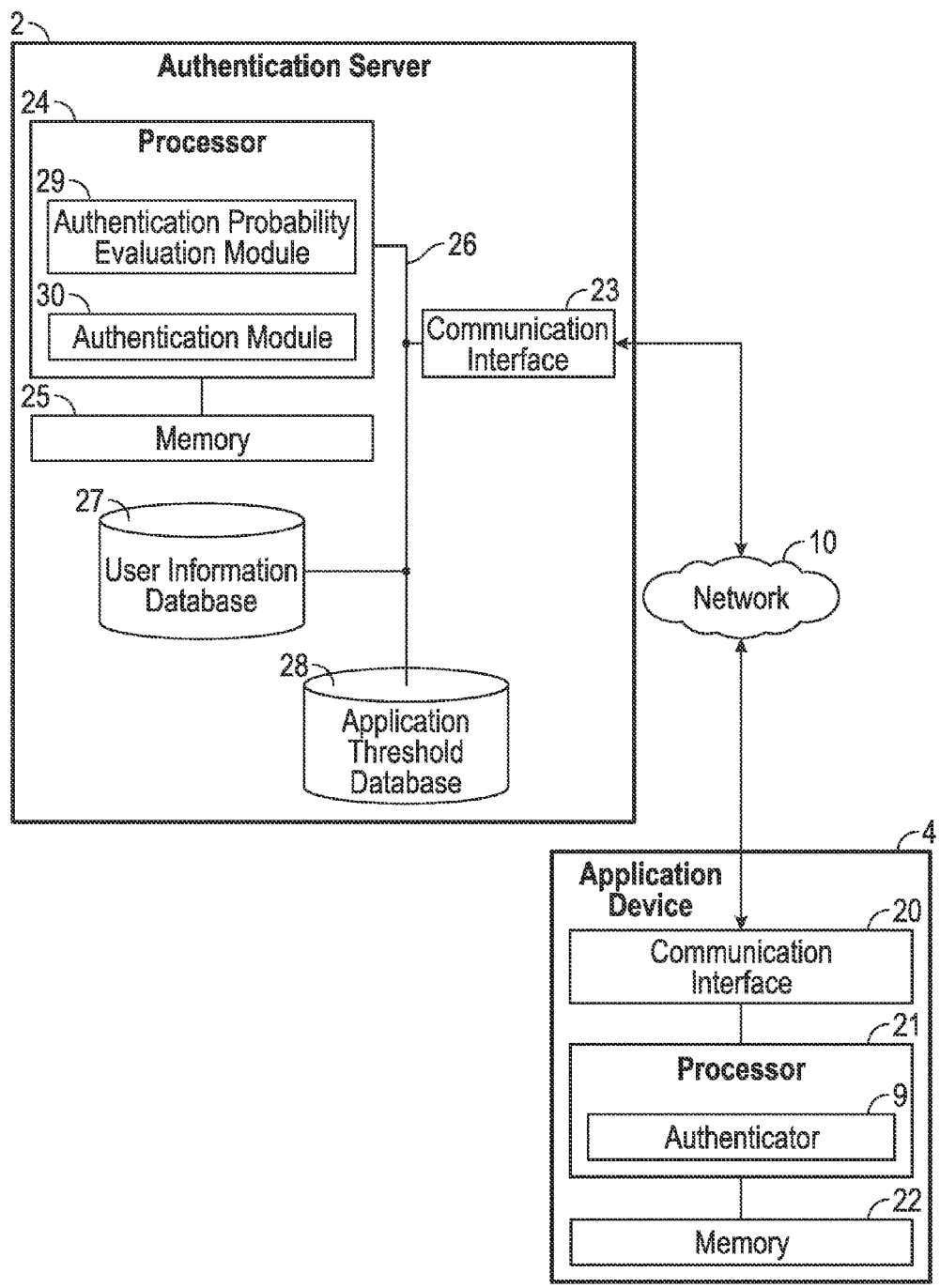
FIG. 2 shows another embodiment of a probability-based user authentication system with an authentication server and a personal computer application device in a schematic block diagram.

FIG. 2 shows a detailed embodiment of authentication server 2 and an exemplary application device, namely personal computer 4 in a schematic block diagram. The setup of other application devices, such as discussed in the preceding with reference to FIG. 1, and with regard to the components necessary for authentication purposes, may be identical or similar to the shown personal computer 4. Certainly, it will be apparent that the setup of application devices 3-9 in other aspects with regard to the functionality of the respective application (car, ATM, security access point) may differ.

Personal computer 4 as shown comprises a communication interface 20 for communication over network 10, i.e. an Ethernet interface. The personal computer 4 further comprises a processor 21 to provide the functionality of authenticator 9, as discussed in more detail in the following. The processor 21 is connected with solid-state memory 22, i.e. RAM, ROM and/or flash memory. Memory 22 comprises machine-readable instructions according to program code or software, which when loaded into processor 21 and subsequently executed, provides the functionality of the authenticator 9. Certainly, the processor 21 is configured to execute further processes, according to the usage of the respective user of the personal computer 4.

Personal computer 4 further comprises a user interface with several I/O devices, i.e. a display, a keyboard, and a mouse to allow interaction with the user, as well as a mains power supply and a housing. So as not to obscure the present explanation, these standard components are not shown in the drawing of FIG. 2.

Authentication server 2 comprises, corresponding to personal computer 4, a communication interface 23 for communication over network 10. Authentication server 2 further comprises a communication bus 26, connecting the communication interface 23 with a processor 24, a user information database 27, and an application threshold database 28. Processor 24 according to the present embodiment provides the functionality of an authentication probability evaluation module 29 and an authentication module 30, which are discussed in more detail in the following. Processor 24 is connected with solid-state memory 25, i.e. RAM, ROM and/or flash memory. Memory 25 comprises machine-readable instructions according to program code or software, which when loaded into processor 24 and subsequently executed, provides the functionality of authentication probability evaluation module 29 and authentication module 30. The processor 24 may additionally be configured to execute further processes.

The user information database 27 comprises user behavior information for different authorized users, which is used by the authentication server 2 to determine a probability of requestor identification, i.e. a probability/likelihood that the requestor is who she or he claims to be, namely the authorized user according to the user identification data presented.

The application threshold database 28 comprises application threshold values for each of the application devices 3-8. The application threshold values are used to determine, whether the determined probability of requestor identification meets the minimum authority level that is needed for granting access to the requested resource of the respective application device 3-8. The application threshold values are predefined according to the respective application and accordingly stored in the application threshold database 28 when the authentication system 1 is initialized or when a new application device is added by communication between the authenticator 9 of the respective new application device and the authentication server 2.

For example, it should be apparent that the minimum authority level required for a successful authentication to access website 6 may be different than the authority level required to access a bank vault, associated with security access point 8.

Both of the above databases 27, 28 are provided on a suitable hard drive (not shown) of the authentication server 2.

As discussed in the preceding, the user information database 27 according to the present embodiment comprises records of user behavior information for multiple authorized users of the authentication system 1. Each of these records comprises a user ID as well as prior probability datasets, describing the prior behavior of the respective authorized user. The generation of the user behavior data is described in the following with reference to FIGS. 5-7.

Figure 3A:
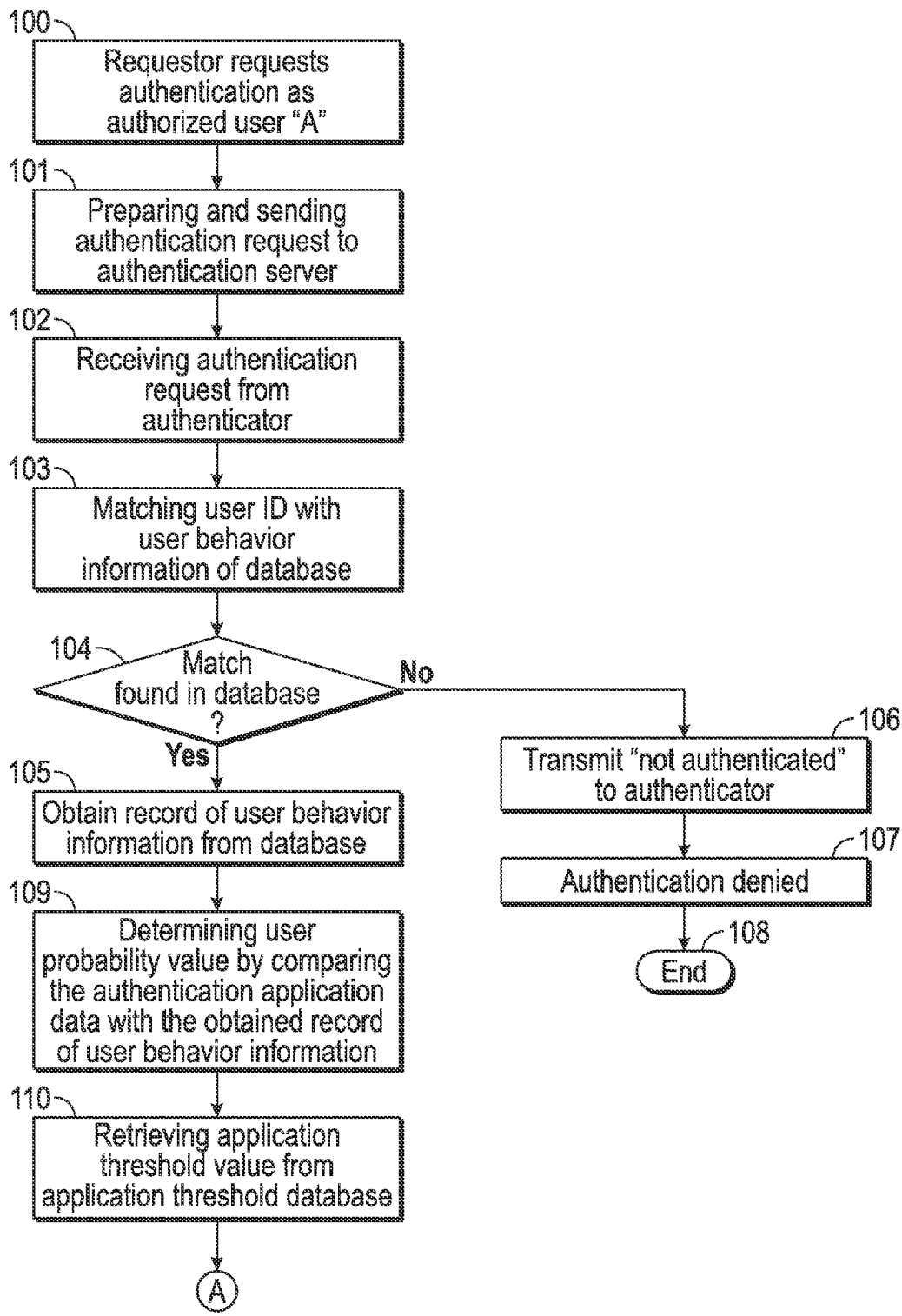
FIGS. 3A and 3B show a flow chart of an exemplary probability-based authentication method.
Figure 3B:
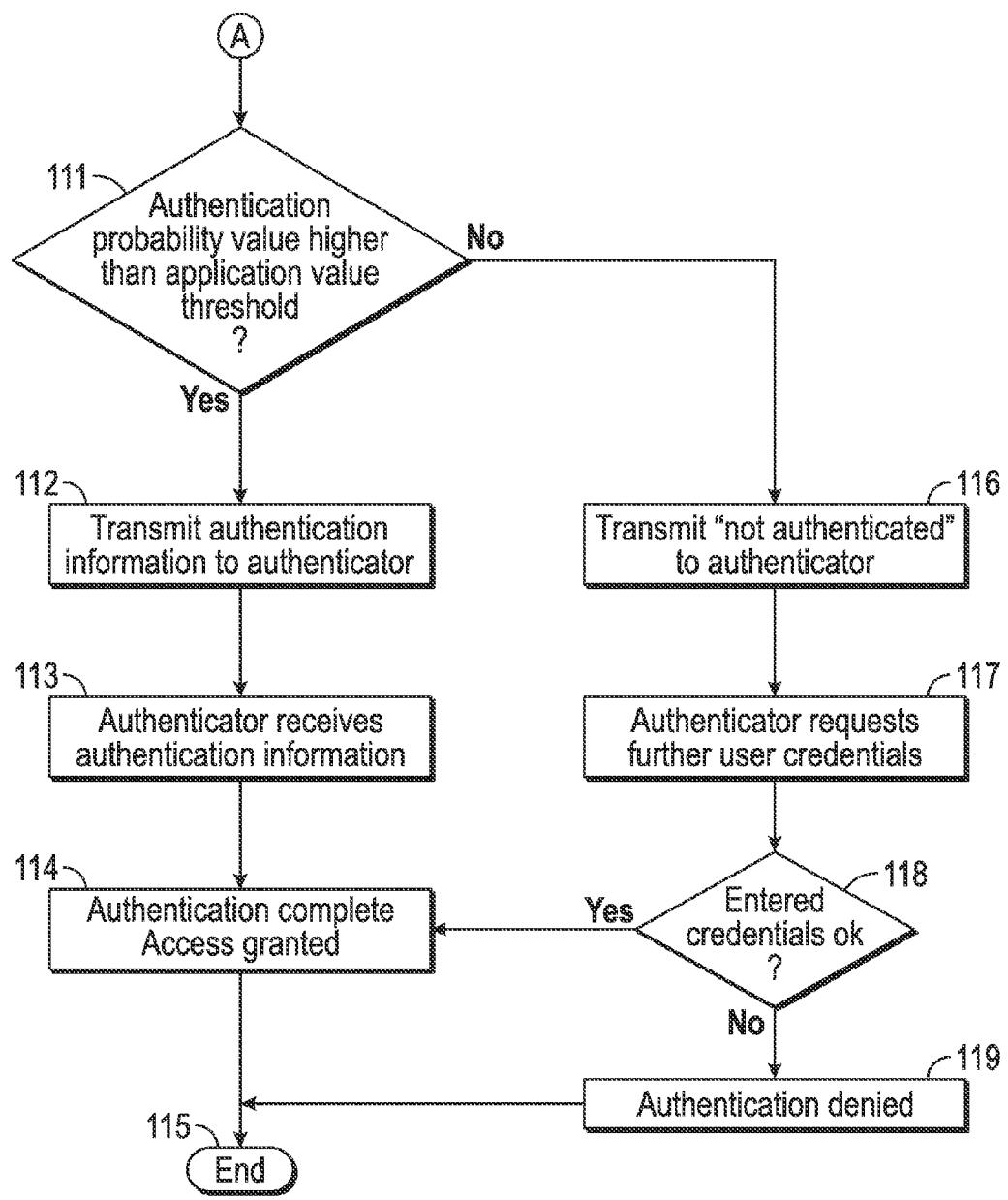

For the following explanation of an embodiment of the probability-based method of authentication according to the flow charts of FIGS. 3A and 3B, it is assumed that a requestor is requesting authentication as authorized user "A" at security access point 8, which controls the entry of a building, namely the workplace of user "A". The user information database 27 comprises a record of user behavior information for user "A", which comprises a prior probability dataset with the following entries:

Prior User Spatiotemporal (Location/Time) Data

| Stored location | Stored time |
| --- | --- |
| 36.987643°/−122.036219° | Oct 1, 2014; 8.35 am |
| 36.987643°/−122.036219° | Oct 2, 2014; 8.34 am |
| 36.987643°/−122.036219° | Oct 3, 2014; 8.30 am |
| 36.987643°/−122.036219° | Oct 6, 2014; 8.00 am |
| 37.787993°/−122.407437° | Oct 5, 2014; 12.00 pm |
| 37.785508°/−122.403994° | Oct 4, 2014; 5.00 pm |
| 48.8606111°/2.337643° | Sep 15, 2014; 3.00 pm |
| 48.858370°/2.294481° | Sep 10, 2014; 10.00 am |
| . . . | . . . |

To not obscure the present discussion, the above table shows only the latest stored location/time entries of the user information database 27. Older entries of the table are indicated by " . . . ".

The probability based authentication according to the present embodiment and with reference to FIG. 3A starts with the requestor requesting to be authenticated as authorized user "A" in step 100. According to the present example, the requestor swipes a magnetic card through a card reader (not shown) of security access point 8, connected with the respective authenticator 9. The user ID of the magnetic card is subsequently transferred to the authenticator 9.

In step 101, the authenticator 9 obtains location data of the security access point 8 from memory (not shown) and obtains the current time from an integrated real-time clock module (RTC, not shown). The RTC module keeps track of current year, month, day, and time. The user ID and authenticator application data are then send to the authentication server 2 over network 10 in an authentication request. The authenticator application data in this case comprises the obtained (application) location data, the authentication time data, i.e. the time of the authentication request by the requestor, and an application ID.

The authentication request is received by the authentication server 2 in step 102, upon which the authentication probability evaluation module 29 queries the user information database 27 in step 103 to obtain the record of user behavior information, corresponding to the user ID of the authentication request. In case no match is found in the user information database 27, the authentication server in step 106 transmits a message to the authenticator 9 of the security access point 8, corresponding to a "not authenticated/user unknown" condition. The authentication of the requestor is then denied in step 107 and the authenticator 9 shows a message on a connected display (not shown) that access is denied. The authentication procedure ends in step 108.

If a matching record of user behavior information, corresponding to the received user ID is determined in step 104, the record is retrieved by the authentication probability evaluation module 29 from the user information database 27 in step 105. For the following discussion, it is assumed that the prior user spatiotemporal dataset according to the preceding table is comprised in the user behavior information and thus transferred to the authentication probability evaluation module 29.

In step 109, the authentication probability evaluation module 29 determines a user probability value by comparing the authenticator application data of the received authentication request with the obtained record of user behavior information. As discussed in the preceding, the authenticator application data comprises the location of the security access point 8 and the time of the authentication request. In the present example, the authenticator application data comprises the following information:

| Application location | Authentication time | Application ID |
|---|---|---|
| 36.987643°/−122.036219° | Oct 7, 2014; 8.40 am | Security access point |

According to the present embodiment, the user probability value corresponds to the probability that the requestor is the authorized user according to the received user ID. The authentication probability evaluation module 29 is programmed to use a likelihood function to calculate the user probability. Here, the record of user behavior information corresponds to an informative prior of the past behavior of the user, associated with the user ID.

According to the present embodiment, the likelihood function is of "Bayesian" type without using a Markov chain. For the following explanation of the likelihood function, it is assumed that every entry of user "A" in the user information database 27 provides an "event" $E_i$ (for the i-th such event) at time $T_i$. An event $E_i$ results in an increase or a decrease of the user probability value by an absolute or relative amount. The amount of change is determined by mentioned likelihood function $F_j(E_i, T_i)$ for the j-th type of event. It is assumed that all events of type j, i.e. here prior user location/time data, will use a similar function to determine the user probability value, e.g., all matching location/time entries for past workdays increase the probability by a predefined absolute value of 10% and any not matching location/time entry for past workdays "dilutes" the user probability value, e.g., by 5%.

It is noted that $F_j$ can be derived from $E_i$, i.e. it is possible to determine from a specific instance of an event what type of event it is, since the respective type of the prior probability dataset of the user information database 27 is known. Accordingly, the specific and predefined function $F_j$ to apply for the respective type of event is retrieved from memory 25 or an appropriate external service.

In addition, it is assumed that the impact of a particular event on the overall probability value degrades according to a function $D_j$ (time elapsed) and that all functions of a particular type of event degrade similarly. It is assumed that $D_j(0)=1$, i.e. no degradation happens at time 0. In the simplest case, $D_j$ provides a linear degradation. Accordingly, for $D_j(x)$ where x is in days, the degradation function may be $$D_j(x) = 0, \text{ if } x >= 30 \text{ and}$$

$$D_j(x) = \frac{30-x}{30} \text{ for all other cases.}$$

According to the current discussion of a "Bayesian" type likelihood function, the events are not independent. The probability of an event is thus influenced by all the other events that happened earlier and follows a Bayesian model. A simplifying Markov chain assumption is not used and therefore the impact of $E_i$ depends on all the events that have happened before it.

It follows that at time $T_0$, $$P = F_0(E_0, T_0),$$

where P is the likelihood of user authentication, i.e. the user probability value.

At time $T_1$, and thus after the first event $$P = D_0(T_1 - T_0) * F_0(E_0, T_0) + F_1(E_1/E_0, T_1),$$

where $F_1$ ($E_1/E_0, T_1$) captures the probability impact of $E_1$, provided that $E_0$ has happened earlier and follows a typical Bayesian type formula approach.

At time $T_2$, the second event happens and the user probability value can be determined as $$P = D_0(T_2 - T_0) * F_0(E_0, T_0) + D_1(T_1 - T_0) * F_1(E_1/E_0, T_1) + F_2(E_2/(E_1, E_0), T_2)$$

where $F_2((E_1, E_0), T_2)$ represents the probability impact of $E_2$ provided that both $E_0$ and $E_1$ have happened.

Thus immediately after k events, the user probability value can be determined as $$P = \sum_{m=0}^{k-1} (D_m(T_k - T_m) * F_m(E_m/(E_{m-1}), E_{m-2}, \ldots), T_m) + F_k(E_k/(E_{k-1}, E_{k-2} \ldots), T_k)$$

And at an arbitrary time $T_n$ between the k-th and (k+1)-th event $$P = \sum_{m=0}^{k} (D_m(T_n - T_m) * F_m(E_m/(E_{m-1}, E_{m-2}, \ldots), T_m))$$

As will be apparent from the above prior user spatiotemporal data, the authorized user is known to have been present at the exact location of the security access point 8 for the last few workdays. The time the user has been at the location of the security access point 8 varies between the last workdays between 8.00 am and 8.35 am. Since the location matches and the time of the present authentication request of 8.40 am only slightly differs from the known range, the authentication probability evaluation module 29 in the present example calculates the initial user probability value to be relatively high, however due to the differing time of the authentication request from the known range in this example only to 0.85 (85%). In a further verification step, the authentication probability evaluation module 29 checks the logical consistency of the user behavior data with the authentication request, i.e. whether the prior user spatiotemporal data comprises an entry, that would make the location of the authentication request for user "A" to be unlikely. This would be for example the case when the prior user spatiotemporal data indicates that user "A" was a few 100 miles away some minutes before the authentication request. In this case, the user probability value would be correspondingly reduced.

However, according to the present embodiment, the prior user spatiotemporal data does not comprise such inconsistent information, so that the user probability value remains at 0.85 (85%).

The determined user probability value and the application ID of the authentication request is in step 110 transferred to the authentication module 30. Upon reception, the authentication module 30 queries the application threshold database 28 to obtain the application threshold value, correlated with security access point 8. In the present example, the application threshold value of security access point 8 is 0.8 (or 80%).

In step 111 the authentication module 30 determines, whether the user probability value is equal to or higher than the application threshold value. Since this is the case in the present example, in step 112, the authentication module 30 sends authentication information to the authenticator 9 of the security access point 8. Simultaneously, the authentication module 30 stores the time/date and the location of the successful authentication in the record of user behavior information of user "A", i.e. in a prior user authentication data entry in user information database 27.

The authentication information in this example comprises information, corresponding to an "authenticated" condition. The authentication information is cryptographically signed by the authentication module 30. Upon reception of the authentication information by the authenticator 9, the cryptographic signature of the authentication information is checked in step 113 and if the signature is as expected, the authentication is completed in step 114 by granting the requestor access to the building. The authentication then ends in step 115.

In the case that the determined user probability value is not found to be equal to or higher than the application threshold value in step 111, the authentication module 30 in step 116 transmits a message to the authenticator 9 of the security access point 8, corresponding to a "not authenticated/probability too low" condition. In the present example, this may be the case when the request for authentication is received at an unusual time, such as 3.00 am in the night.

The reception of this message by the authenticator 9 causes the connected display inform the requestor that further user credentials are necessary for a successful authentication. The requestor may then enter a password on a connected keyboard. The entered password is checked in step 118 against a stored password of user "A", comprised in a remote credential database (not shown), connected with the authenticator 9. This step corresponds to known authentication processes.

In case the entered password matches the stored copy, the requestor is authenticated in step 114 according to the above discussion. Otherwise, authentication and access is denied in step 119. In both events, the authentication method ends in step 115.

As will be apparent from the above, the probability based authentication according to the present embodiment increases the convenience of accessing an access-restricted resource, since at least in some instances, the tedious entry of a password can be omitted, namely when the request corresponds to the prior behavior of the authorized user. However, this may be the case relatively often, as many tasks during daily life follow a repetitive schedule. In these instances and due to the functionality of authentication server 2, which corresponds to a "smart background check", it is possible to authenticate the requestor without asking for user credentials, such as a password, PIN, etc. Furthermore, the security of the authentication is improved due to the fact that some user credentials, such as passwords and PINs can be stolen, but that in general it is more difficult to "steal" a user's background or past behavior.

Certainly, in one embodiment, the present authentication method may be used in addition to a PIN/password entry to further increase the security of the authentication.

It is noted that the automatic determination of the user probability value by the authentication probability evaluation module 29 depends on the user behavior information, stored in the user information database 27. In case limited user behavior information is present in database 27, an entry of user credentials may be required more frequently upon authentication. Certainly, without any user behavior information stored, such as upon initialization of a new user account, an entry of user credentials during the authentication may generally be required by the authenticator 9.

When the user information database 27 comprises a significant amount of user behavior information on the other hand, a determination of "behavior patterns" of the authorized user and thus in the present example, of unexpected, suspicious, or unusual authentication requests, both, regarding location and time is possible, leading to a further improved calculation of the user probability value.

As discussed in the preceding, the user information database 27 according to the present embodiment comprises the record of user behavior information for user "A", having prior user spatiotemporal data as one prior probability dataset. Certainly, the user information database 27 may have additional or alternative prior probability datasets, such as in particular prior user authentication data, prior user proximity data, and prior user I/O pattern data.

Another embodiment of an authentication method using authentication server 2 is discussed in the following. According to the present embodiment, authentication is requested in terms of logging into personal computer 4 as authorized user "A". In this embodiment, the record of user behavior information for user "A" comprises the following prior probability datasets:

Prior User Authentication Data

| Prior successful authentications |
| --- |
| Oct 7, 2014; 9.20 am |
| Oct 6, 2014; 8.25 am |
| Oct 3, 2014; 8.45 am |
| Oct 2, 2014; 9.10 am |
| Oct 1, 2014; 8.45 am |
| ... |

Prior User I/O Pattern Data

| Stored device | Stored pattern data |
| --- | --- |
| Keyboard/PC | Average button dwell time = 85 ms |
| Keyboard/PC | Average button flight time = 1 s |
| Mouse/PC | Average mouse speed = 0.1 m/s |
| Mouse/PC | Average button dwell time = 65 ms |
| Keyboard/PC | Average unique timing for a specific key sequence, e.g., "c-h" = 90 ms |
| ... | ... |

As is apparent from the above tables, the record of user behavior information of user "A" according to the present embodiment comprises prior user authentication data and prior user I/O pattern data. The prior user authentication data comprises information about prior successful authentications of the user "A", recorded during the authentication as discussed in the preceding with reference to FIGS. 3A and 3B. The prior user I/O pattern data comprises keystroke and mouse dynamics, i.e. behavioral biometrics of user "A". In particular, the prior user I/O pattern data comprises information of prior keyboard/computer mouse operations of user "A", namely in this case the average dwell time on a keyboard, i.e. the time a key is pressed, and the average flight time on a keyboard, i.e. the time between releasing a button and the next subsequent press of a button. Furthermore, the prior user I/O pattern data comprises information about typical mouse speeds, typical button dwell times of a mouse button, and unique timing characteristics for defined key sequences.

Certainly, depending on the authentication request, the authentication probability evaluation module 29 of authentication server 2 may only use some of the above biometrics for determining the user probability value.

For the present embodiment, it is assumed that the requestor requests to login at personal computer 4 as user "A". Upon entry of his username on a keyboard of personal computer 4, authenticator 9 of said personal computer 4 transmits an authentication request to authentication server 2. The operation during authentication in the present embodiment corresponds to the operation as discussed in the preceding with reference to FIGS. 3A and 3B with the following exceptions.

The authenticator application data according to this embodiment comprises authentication time data, i.e. the time of the authentication request by the requestor, an application ID of personal computer 4, and application I/O pattern data. In the present example, the authenticator application data comprises the following information:

| Authentication time | Application I/O pattern data | Application ID |
|---|---|---|
| Oct 8, 2014; 8.40 am | Average button dwell time = 85 ms Average button flight time = 1 s | Personal computer |

The application I/O pattern data in this embodiment comprises button dwell and flight times from the entry of the username by the requestor, as mentioned above.

In step 109 and corresponding to the preceding discussion of FIGS. 3A and 3B, the authentication probability evaluation module 29 determines a user probability value by comparing the authenticator application data of the received authentication request with the obtained record of user behavior information according to $$P = \sum_{m=0}^{k} (D_m(T_n - T_m) * F_m(E_m/(E_{m-1}, E_{m-2}, \ldots), T_m)),$$

as discussed in the preceding.

As will be apparent, the button dwell and flight times of the authenticator application data matches the record of user behavior information, stored in user information database 27 according to the present embodiment, leading to a calculation of the user probability value by the authentication probability evaluation module 29 to 1.0 (i.e. 100%). In the mentioned verification step, the authentication probability evaluation module 29 checks the time period between the present authentication request and the latest previous successful authentication. The user probability value is degraded according to the determined time period, where with increasing time between the latest successful authentication and the present authentication request, the user probability value is degraded accordingly. Degradation according to the present embodiment is conducted according to the following formula:

$$D_j(y) = 0, \text{ if } y >= 48 \text{ and}$$

$$D_j(y) = \frac{48 - y}{48} \text{ for all other cases,}$$

where y refers to the time period in hours that have passed since last successful authentication.

According to the present embodiment, the latest successful authentication is approximately one day ago, leading to a degradation of the user probability value to 0.50 (50%). Since in the present embodiment, the application threshold value of personal computer 4 is 0.4 (or 40%), the requestor is successfully authenticated according to the preceding discussion of FIGS. 3A and 3B.

The authentication information, transmitted to the authenticator 9 of personal computer 4 in step 112, according to this embodiment comprises digital credentials of user "A", which is then used by authenticator 9 to load the user profile from user "A" from a connected file server (not shown).

A further embodiment is discussed in the following, referring to the authentication of a requestor as authorized user "A" of smart phone 5. According to the present embodiment, the record of user behavior information for user "A" comprises the following prior probability datasets:

Prior User Proximity Data

| Stored device | Device proximate counter |
|---|---|
| BLUETOOTH ADDRESS 1 (Smart watch) | 500 |
| BLUETOOTH ADDRESS 2 (Wristband) | 465 |
| BLUETOOTH ADDRESS 3 (Laptop computer) | 240 |
| BLUETOOTH ADDRESS 4 (mobile phone) | 85 |
| . . . | |

Prior User I/O Pattern Data

| Stored device | Stored pattern data |
|---|---|
| Smart phone accelerometer | Average walking pace |
| Wristband accelerometer | Average walking pace |
| Bluetooth Headset | Time since doffed: 1 second |
| . . . | . . . |

Prior User Spatiotemporal (Location/Time) Data

| Stored location | Stored time |
|---|---|
| 36.987643°/−122.036219° | Oct 8, 2014; 8.35 am |
| 36.987643°/−122.036219° | Oct 7, 2014; 8.34 am |
| 36.987643°/−122.036219° | Oct 3, 2014; 8.30 am |
| 36.987643°/−122.036219° | Oct 6, 2014; 8.00 am |
| 37.787993°/−122.407437° | Oct 5, 2014; 12.00 pm |
| 37.785508°/−122.403994° | Oct 4, 2014; 5.00 pm |
| 48.8606111°/2.337643° | Sep 15, 2014; 3.00 pm |
| 48.858370°/2.294481° | Sep 10, 2014; 10.00 am |
| . . . | . . . |

The above user behavior data comprises prior user proximity data of other devices that have been frequently detected in the vicinity of smart phone 5. The other devices are listed with the respectively detected Bluetooth addresses and a counter that is increased in case the respective device is found in the smart phone's 5 vicinity in a training cycle. During the training cycle, the proximity of devices is determined based on an RSSI measurement (received signal strength indication) as known. The operation during a training cycle is explained in more detail in the following.

Accordingly, the counter provides a measure on how usual it is that the respective device is proximate to smart phone 5. From the above table of prior user proximity data, it can be seen that the Bluetooth addresses associated with a smart watch, a wristband, and a laptop computer are relatively frequent in the vicinity of smart phone 5, which is an indicator that these devices are owned by user "A". In the above table, the counter of Bluetooth address 4, associated with a mobile phone is lower that the respective other counters. This is an indication that the device is not typically with user "A". The device could however, be a device of a coworker, a friend, or a family member of user "A", since the device has been detected during some training cycles.

The above prior user I/O pattern data according to the present embodiment comprises average walking pace data, obtained during past training cycles from an accelerometer module (not shown) of smart phone 5. Further walking pace data is obtained from the wristband, which also comprises an accelerometer module (not shown). The average walking pace data corresponds to an "acceleration signature". The prior I/O pattern data also comprises information on the average time a Bluetooth headset (not shown) is doffed, which is used to degrade the user probability value in this embodiment. A corresponding headset that allows detection of its donned/doffed status is discussed in patent application publication US2009/0249478A1.

For the present embodiment, it is assumed that the requestor requests to unlock smart phone 5, which is configured for user "A". Upon pressing a corresponding "unlock" button on the touch screen (not shown) of smart phone 5, the corresponding authenticator 9 of said smart phone 5 transmits an authentication request to authentication server 2.

The operation during authentication according to the present embodiment corresponds to the operation as discussed in the preceding with reference to FIGS. 3A and 3B with the following exceptions.

The authenticator application data according to this embodiment comprises authentication time and location data, i.e. the time and location of the authentication request by the requestor, application proximity data, application I/O pattern data, and an application ID of smart phone 5. In the present example, the authenticator application data comprises the following information:

| Application location data | Authentication time data | Application proximity data | Application I/O pattern data | Application ID |
|---|---|---|---|---|
| 36.9615°/ −122.022° | Oct 8, 2014; 4.40 pm | Smart watch, Wristband | Current walking pace | Smart phone |

The application proximity data in this embodiment indicates that the smart watch and the wristband of user "A" are in the vicinity of smart phone 5. Furthermore, the I/O pattern data in this embodiment comprises information on a currently detected walking pace by the internal accelerometer (not shown) of smart phone 5.

In step 109 and again corresponding to the preceding discussion of FIGS. 3A and 3B, the authentication probability evaluation module 29 determines a user probability value by comparing the authenticator application data of the received authentication request with the obtained record of user behavior information. With regard to the mathematical details of the determination of the user probability value, reference is made to the preceding embodiments.

The determination of the user probability value according to the present embodiment comprises a comparison of the application location data and the location time data with the prior user spatiotemporal data of the corresponding record of user behavior information according to the above table. In addition, authentication probability evaluation module 9 determines, whether the devices in the vicinity of the smart phone 5 are comprised in the stored prior user proximity data. Furthermore, the current walking pace is compared with the average walking pace of user "A", as obtained from the smart phone 5 and the wristband in the past.

Assuming that the current walking pace corresponds to the stored average walking pace, the comparison thereof by the authentication probability evaluation module 29 will result in a relatively high probability that the requestor is the authorized user "A" and thus high user probability value. Furthermore, the devices in the vicinity of smart phone 5 according to the application proximity data are listed in the prior user proximity data with a high counter number. The comparison of the current location and time of the authentication request according application location data and the authentication time data reveals that while the location is not known, it is close to a previous location of the prior user spatiotemporal data.

It is assumed that the calculation of the user probability value by the authentication probability evaluation module 29 leads to an overall user probability value of 0.86 (86%). The user probability value is degraded according time period, the Bluetooth headset of the user is doffed. Degradation according to the present embodiment is conducted according to the following formula:

$$D_j(z)=1, \text{ if } z<2 \text{ seconds and}$$

$$D_j(z)=e^{-0.1*z}, \text{ if } z>=2 \text{ seconds,}$$

where z refers to the time period in seconds that the Bluetooth headset is doffed. The above degradation function allows the user probability value to be retained at its original level if the user has doffed the headset for less than 2 seconds, but then starts to degrade asymptotically after 2 seconds.

Since in the present embodiment, the headset was doffed only for one second before the authentication was requested, no degradation is applied to the determined user probability value. According to this embodiment, the application threshold value of smart phone 5 is predefined to 0.6 (or 60%). The requestor is accordingly successfully authenticated according to the preceding discussion of FIGS. 3A and 3B.

According to the present embodiment, the authentication server 2 sends authentication information to authentication 9 of smart phone 5, corresponding to an "authenticated" condition. Upon reception of the authentication information by authenticator 9, the smart phone 5 is unlocked and operational.

Figure 4:
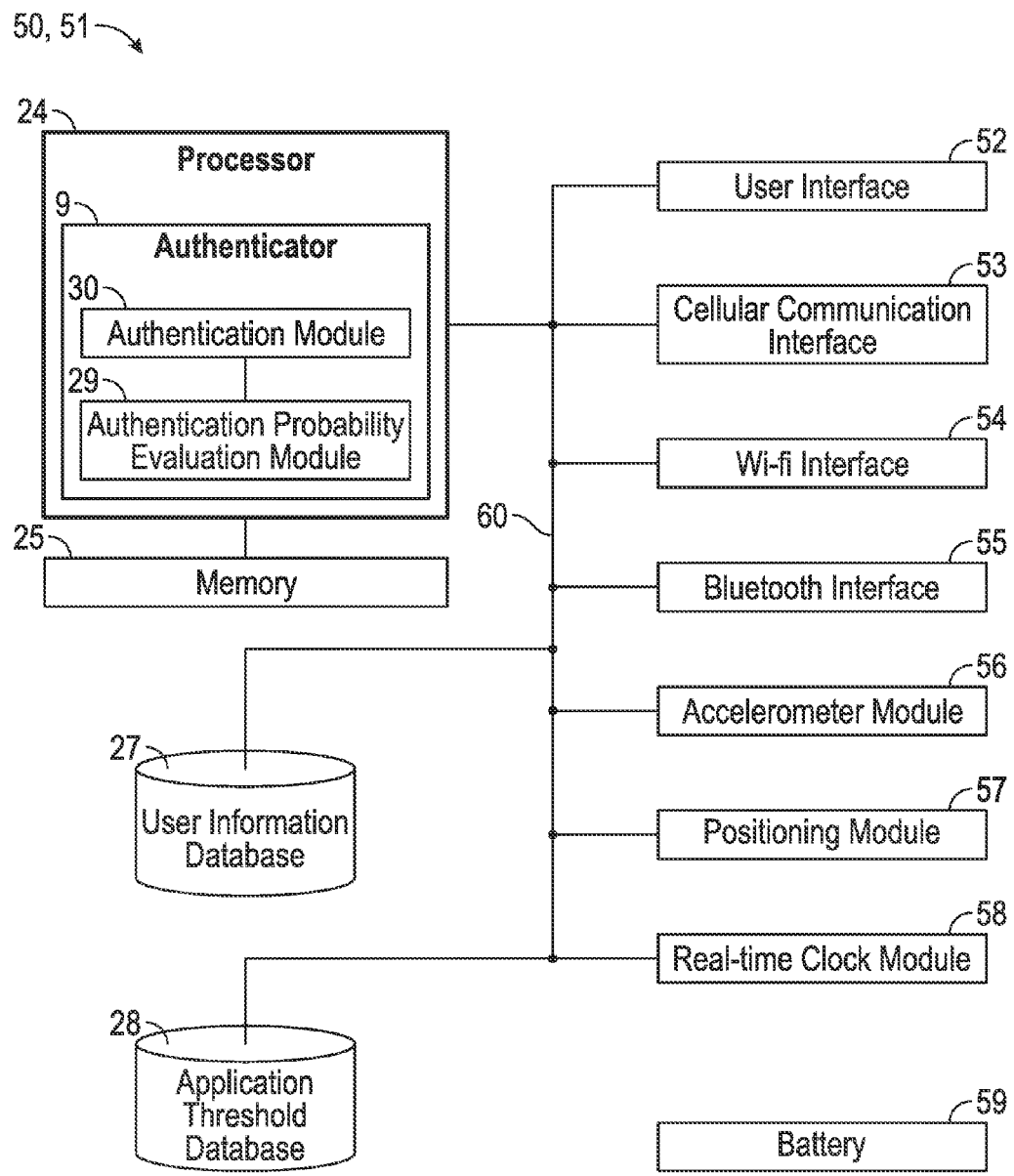
FIG. 4 shows a further embodiment of a probability-based user authentication system with an authentication server, integrated with an application device, in a schematic block diagram.

While the above embodiments show an authentication system 1, where authentication server 2 is provided remotely from the application devices 3-8, FIG. 4 shows an embodiment of an application device, namely a smart phone 50, with an integrated authentication server 51. As can be seen from FIG. 4, the authentication probability evaluation module 29 and the authentication module 30 are in this embodiment formed as a subsystem of authenticator 9.

The smart phone 50 further comprises a user interface unit 52, which according to the present embodiment comprises a touch screen display, multiple buttons, and an audio I/O subsystem having a microphone and a speaker. The smart phone 1 further comprises a cellular communication interface 53 for communication using the GSM protocol, a Wi-Fi communication interface 54 for communication using one of the IEEE 802.11 protocols, and a Bluetooth communication interface 55. In addition thereto, the smart phone 50 comprises an accelerometer module 56 for providing acceleration information. A positioning module 57 comprises an A-GPS (assisted GPS) receiver. The positioning module 57 is configured to provide longitude and latitude information of the current position of the smart phone 50 in regular intervals. A real-time clock module 58 keeps track of current year, month, day, and time.

All of the aforementioned components 52-58 are connected with processor 3 over a communication bus 60 to exchange data and control the various functions of smart phone 50 and its components. Although not shown, all of the components of smart phone 1 are build-in a portable, hand-held housing. The smart phone 50 according to the present embodiment is powered by a rechargeable battery 59.

Figure 5:
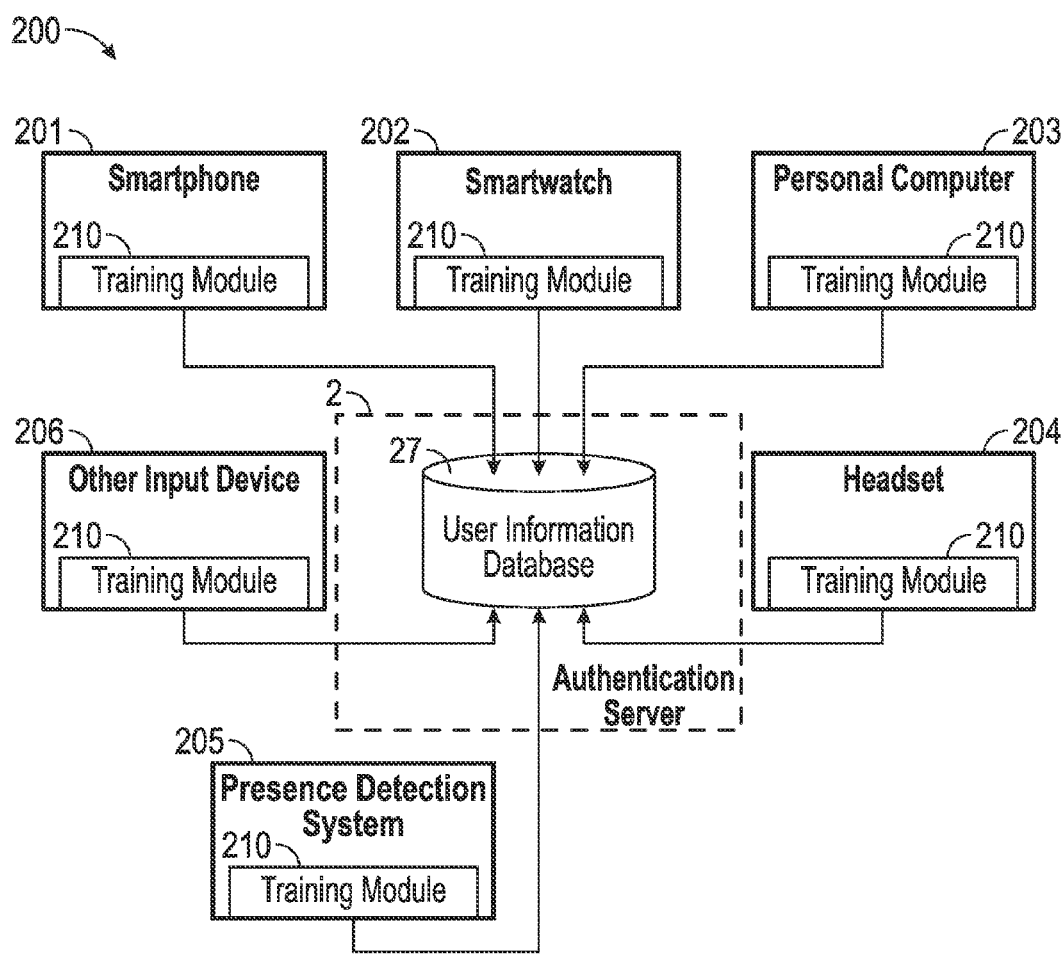
FIG. 5 shows an embodiment of a training system for collecting user behavior information in a schematic block diagram.

FIG. 5 shows an embodiment of a training system 200 for collecting user behavior information in a schematic block diagram. The training system 200 comprises multiple input devices, namely a smart phone 201, a smart watch 202, a personal computer 203, a headset 204, and a presence detection system 205. Each of the input devices comprises a training module 210, for obtaining user behavior information from a connected sensor or detector (both not shown) and transmitting said user behavior information to the connected user information database 27 of authentication server 2.

The training module 210 is provided as part of a microprocessor, which is connected to memory (both not shown in FIG. 5) of the respective input device. The memory comprises machine-readable instructions according to program code or software, which when loaded into the microprocessor and subsequently executed, provides the functionality of the training module 210 described in the following.

The setup of smart phone 201 corresponds to the setup of smart phone 50, which the exception of training module 210 being provided in processor 24. According to the present embodiment, the training module 210 of smart phone 201 is connected to positioning module 57 for obtaining location information and to real-time clock module 58 for obtaining time information. Training module 210 further determines user proximity data, i.e. data regarding the presence of further devices in its vicinity, from Bluetooth interface 55, and user I/O pattern data, comprising information corresponding to average walking pace of the user, obtained from accelerometer module 56.

Training module 210 of smart phone 201 regularly transmits the collected information to the user information database 27. The above-mentioned information is then stored in corresponding prior probability datasets in the database 27.

The training module 210 of smart watch 202 transmits user I/O pattern data to the user information database 27, comprising information corresponding to the average walking pace of the user obtained from an accelerometer module (not shown).

The training module 210 of personal computer 203 determines and transmits to user information database 27 user I/O pattern data, comprising keystroke information corresponding to the average keyboard button dwell time, the average keyboard button flight time, the average mouse speed, and the average button dwell time of a connected keyboard and mouse (both not shown) when the respective user is logged on.

The training module 210 of headset 204 determines and transmits to user information database 27 user I/O pattern data, namely the average time, the headset is doffed by its user, in case it is doffed. A corresponding don/doff detector is disclosed in patent application publication US2009/0249478A1.

The presence detection system 205 is connected with an external camera (not shown). The training module 210 of presence detection system 205 determines by optical recognition, whether a specific user is a room, such as his workplace. The training module 210 of this input device compiles user spatiotemporal data, comprising time and location information, when the specific user is detected.

Certainly, the system 200 may comprise further input devices 206, such as in particular mobile and/or wearable input devices, to obtain user behavior information of a respective user and transmit said user behavior information to the user information database 27. Corresponding input devices 206 may have internal or external detector modules, sensors, or other devices to determine a specific behavior of the respective user.

Figure 6:
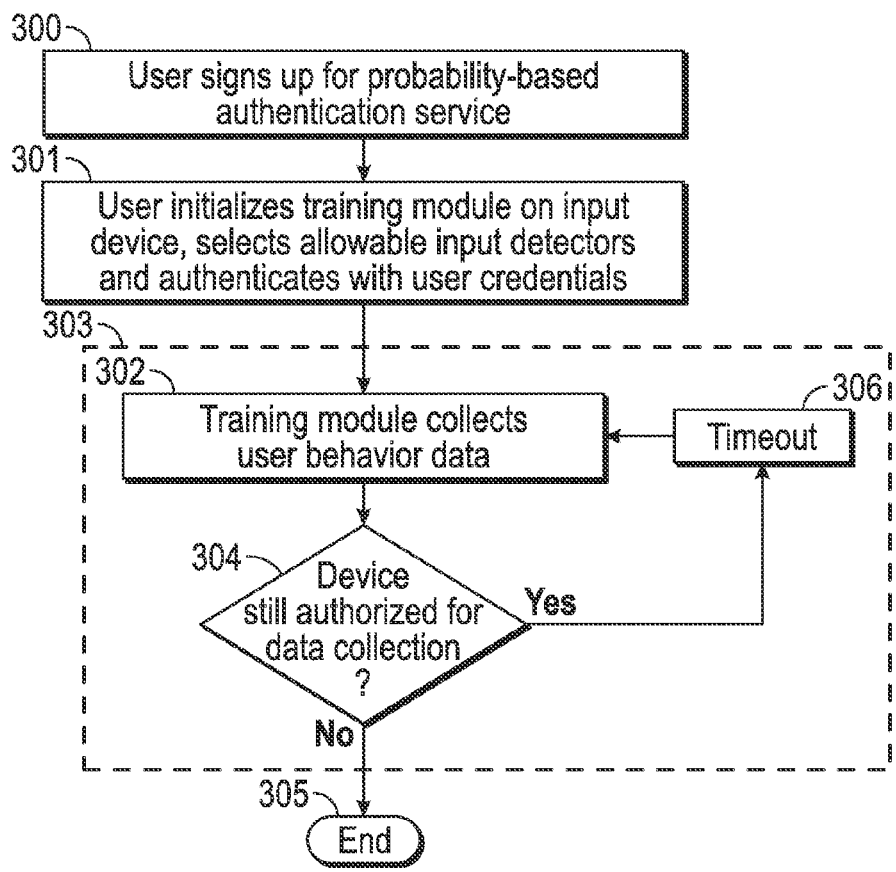
FIG. 6 shows a flow chart of the operation of the embodiment of FIG. 5 during training.

The operation of training system 200 is in the following explained in an embodiment and with reference to the flow chart of FIG. 6.

In step 300, the user signs up to participate in the probability-based authentication system and service and links his respective user ID or account to the system. Step 300 can be conducted on a corresponding webpage or a downloaded application, which is installed on, e.g. on smart phone 201.

In step 301, the user initializes the training module 210 of the respective input device 201-206 and selects, which sensors and detectors are active. For example, a user may agree to the collection of user I/O pattern data, but not of location/time data due to privacy concerns. The initialization is repeated by the user on all respective input devices 201-206.

Once the training module 210 is initialized, operation in training cycle 303 is conducted. In step 302 of training cycle 303, the training module 210 determines the user behavior information from the allowed sensors or detectors. The details of the operation in step 302 will be explained in the following with reference to FIG. 7

In step 304, it is determined, whether the device is still authorized by the user to obtain user behavior information. For example, in case the user does not want to participate further in the probability-based authentication service or in case the user wants to sell the respective input device, he may deregister the device. Then, the operation in the training cycle ends in step 305.

Otherwise, the training module 210 waits for a defined timeout in step 306 and then again determines the current user behavior information from the allowed sensors or detectors in step 302. Certainly, the operation of training module 210 is conducted as a background task so that the functionality of the respective input device 201-206 is not impaired.

Figure 7:
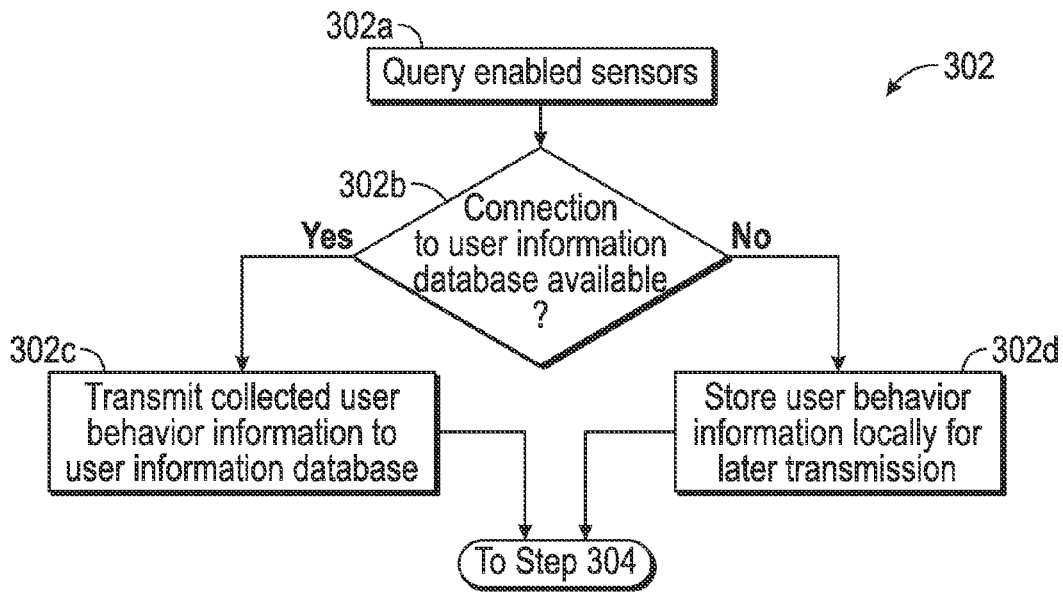
FIG. 7 shows a detailed flow chart of the operation in a training cycle of the embodiment of FIG. 5.

FIG. 7 shows a detailed flow chart of an embodiment of the operation during the collection of user behavior data in step 302. Upon initiation, the enabled sensors or detectors are queried to obtain the respective user behavior information in step 302a. As discussed in the preceding, smart phone 201 for example is adapted to collect user spatiotemporal data, which comprises location information, correlated with time information, user proximity data, and user I/O pattern data.

In step 302b it is determined, whether a connection to the user information database 27 can be established. If this is the case, the training module 210 in step 302c transmits the collected user behavior information to the user information database 27, upon which the determined user data becomes "past" user data, i.e. information of past user behavior for a later determination of the probability of requestor identification, as explained in the preceding. For example, in case a further device is detected in the vicinity of smart phone 201, this information is used to increase a corresponding counter of the respective entry of the prior user I/O pattern data, stored in user information database 27.

In case no connection with the user information database 27 can be established, the user behavior information is stored locally in the respective input device 201-206 in step 302d and transmitted, when a connection can be established. In both cases, the operation then continues step 304, as discussed.

While the invention has been illustrated and described in detail in the drawings and foregoing description, such illustration and description are to be considered illustrative or exemplary and not restrictive; the invention is not limited to the disclosed embodiments.

For example, it is possible to operate the invention in an embodiment wherein

- the user information database 27 is, instead of being formed integrally with authentication server 2 or smart phone 50, formed externally thereof and being connected with authentication server 2 or smart phone 50,
- the functionality of one or more of authentication probability evaluation module 29 and authentication module 30 instead of being provided by executing software, being provided by dedicated circuitry formed integrally with processor 24 or externally thereof in authentication server 2,
- the functionality of training module 210 instead of being provided by executing software, being provided by dedicated circuitry formed integrally with the respective input device,
- the application threshold database 28 is, instead of being formed integrally with authentication server 2 or smart phone 50, formed externally thereof and being connected with authentication server 2 or smart phone 50,
- in step 117 of the embodiment of FIGS. 3A and 3B, instead of or in addition to obtaining a password as further user credentials, the authenticator 9 is configured to query the user for a PIN, voiceprint, and/or a fingerprint,
- the prior user authentication data additionally comprises location data associated with the location of prior successful authentications, and/or
- the prior user authentication data additionally comprises information (time and/or location) of unsuccessful authentication attempts.

It is noted that it is also possible to operate the invention in one of the preceding embodiments, where instead of the likelihood function of "Bayesian" type, a non-Bayesian likelihood function is used. Here, it is assumed that all the events $E_i$ are independent and the initial probability is set by event $E_0$ at time $T_0$, which may be 100%, 0% or anything in between and serves as a mechanism to initialize the probability function. Immediately after k events, the user probability value P is $$P = \sum_{m=0}^{k-1} (D_m(T_k - T_m) * F_m(E_m, T_m)) + F_k(E_k, T_k),$$

and at an arbitrary time $T_n$ between the k-th and (k+1)-th event $$P = \sum_{m=0}^{k} (D_m(T_n - T_m) * F_m(E_m, T_m)).$$

Alternatively, it is also possible to operate the invention in one of the preceding embodiments, where instead of the likelihood function of "Bayesian" type without Markov chain, a Bayesian type likelihood function with a Markov chain is used. In this embodiment, the events are not independent. The probability of an event is thus influenced by all the other events that happened earlier and follows a Bayesian type model. However, we assume a simple Markov chain model with each event only being dependent on the immediately preceding event. The user probability value P thus is $$P = \sum_{m=0}^{k-1} (D_m(T_k - T_m) * F_m(E_m / E_{m-1}, T_m)) + F_k(E_k / E_{k-1}, T_k),$$

and at an arbitrary time $T_n$ between the k-th and (k+1)-th event $$P = \sum_{m=0}^{k} (D_m(T_n - T_m) * F_m(E_m / E_{m-1}, T_m)).$$

Furthermore, it is possible to operate the invention in one of the preceding embodiments, where instead of the degradation as described in the preceding, the degradation of the user probability value is a cliff function, which decreases slowly for the first 24 hours, and then abruptly drops over the next 2 hours:

$$D_j(x) = \frac{100 - x}{100}, \text{ if } x < 24,$$

$$D_j(x) = \frac{26 - x}{26}, \text{ if } 24 <= x <= 26, \text{ and}$$

$$D_j(x) = 0, \text{ if } x > 26,$$

where x refers to the time period in hours that has passed.

Alternatively, it is possible to operate the invention in one of the preceding embodiments, where instead of the degradation as described in the preceding, the degradation of the user probability value is an asymptotic decay:

$$D_j(x) = e^{-x},$$

where x refers to the time period in hours that has passed.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor, module or other unit may fulfill the functions of several items recited in the claims.

The mere fact that certain measures are recited in mutually different dependent claims does not indicate that a combination of these measures cannot be used to advantage.

A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

What is claimed is:

1. An authentication server for a probability-based user authentication system, comprising at least
   an authentication probability evaluation module for determining a probability of requestor identification; and
   an authentication module; wherein
   said authentication server is configured to at least receive an authentication request from an authenticator, said authentication request comprising at least user identification data; and
   said authentication probability evaluation module is configured upon reception of said user identification data
      to receive user behavior information from a user information database, which user behavior information corresponds to the received user identification data and which user behavior information allows the determination of prior or past behavior of the requestor; and
      to determine a user probability value, corresponding to a probability of requestor identification, said probability of requestor identification being based upon prior or past behavior of the requestor, said determination comprising comparing at least said user behavior information with authenticator application data, which authenticator application data being provided by said authenticator; and wherein
   said authentication module is configured
      to receive said determined user probability value from said authentication probability evaluation module;
      to determine an application threshold value from a plurality of different application threshold values, each application threshold value being correlated with at least one of a plurality of authenticators and relating to a minimum required probability of requestor identification of the respective authenticator;
      to compare the determined application threshold value with said user probability value; and
      in case said user probability value corresponds to said application threshold value, to transmit user authentication information to said authenticator.

2. The authentication server according to claim 1, wherein said user probability value corresponds to said application threshold value in case said user probability value is equal to or higher than said application threshold value.

3. The authentication server according to claim 1, wherein said authenticator application data comprises one or more application parameters from the group of application parameters of: application location data, authentication time data, application proximity data, and application I/O pattern data.

4. The authentication server according to claim 1, wherein said user behavior information comprises one or more prior probability datasets from the group of prior probability datasets of: prior user spatiotemporal data, prior user authentication data, prior user proximity data, and prior user I/O pattern data.

5. The authentication server according to claim 1, wherein
   said authenticator application data comprises at least application location data; and
   said user behavior information comprises at least prior user spatiotemporal data; wherein
   said authentication probability evaluation module is configured to determine said user probability value in dependence of whether said application location data corresponds to said prior user spatiotemporal data.

6. The authentication server according to claim 1, wherein
   said authenticator application data comprises at least authentication time data; and
   said user behavior information comprises at least prior user authentication data; wherein
   said authentication probability evaluation module is configured to determine said user probability value in dependence of the time passed since a prior authentication.

7. The authentication server according to claim 1, wherein
   said authenticator application data comprises a plurality of different application parameters; and
   said user behavior information comprises a plurality of different prior probability datasets; wherein
   said authentication probability evaluation module is configured to determine said user probability value by comparing said plurality of application parameters with said plurality of prior probability datasets.

8. The authentication server according to claim 1, wherein in case the requestor is authenticated, prior user authentication data is stored in said user information database, comprising at least said authentication time data.

9. The authentication server according to claim 1, wherein said authentication module is configured to receive said application threshold value from an application threshold database, which application threshold database comprises the plurality of application threshold values, wherein each application threshold value is correlated with at least one of a plurality of authenticators.

10. The authentication server according to claim 9, further comprising said application threshold database, wherein said application threshold database is coupled to said authentication module.

11. The authentication server according to claim 1, further comprising said user information database, wherein said user information database is coupled with said authentication probability evaluation module.

12. The authentication server according to claim 1, wherein said authentication request comprises said authenticator application data.

13. The authentication server according to claim 1, wherein said authentication request comprises said application threshold value.

14. The authentication server according to claim 1, further comprising a communication interface for communicating at least with said authenticator.

15. The authentication server according to claim 1, wherein the application threshold value being determined in dependence of the authenticator.

16. The authentication server according to claim 1, wherein each of the plurality of application threshold values being associated with an authentication application.

17. Probability-based user authentication system, comprising at least an authentication server and an application device, wherein
said application device comprises at least an authenticator;
said authenticator is configured to provide an authentication request to said authentication server;
said authentication request comprises at least user identification data; and
said authentication server comprises an authentication probability evaluation module and an authentication module; wherein
said authentication probability evaluation module is configured upon reception of said user identification data
to receive user behavior information from a user information database, which user behavior information corresponds to the received user identification data and which user behavior information allows the determination of prior or past behavior of a requestor; and
to determine a user probability value, corresponding to a probability of requestor identification, said probability of requestor identification being based upon prior or past behavior of the requestor, said determination comprising comparing at least said user behavior information with authenticator application data, which authenticator application data being provided by said authenticator; and wherein
said authentication module is configured
to receive said determined user probability value from said authentication probability evaluation module;
to determine an application threshold value from a plurality of different application threshold values, each application threshold value being correlated with at least one of a plurality of authenticators and relating to a minimum required probability of requestor identification of the respective authenticator;
to compare the determined application threshold value with said user probability value; and
in case said user probability value corresponds to said application threshold value, to transmit user authentication information to said authenticator.

18. Probability-based user authentication system according to claim 17, wherein the application device comprises a user interface and said authenticator being configured to query user credentials in case no authentication information is received from said authentication server.

19. Computer-implemented method of probability-based user authentication with an authentication server, comprising
receiving an authentication request by the authentication server from an authenticator, said authentication request comprises at least user identification data;
receiving user behavior information from a user information database, which user behavior information corresponds to the received user identification data and which user behavior information allows the determination of prior or past behavior of a requestor;
determining a user probability value, corresponding to a probability of requestor identification, said probability of requestor identification being based upon prior or past behavior of the requestor, said determination comprising comparing at least said user behavior information with authenticator application data, which authenticator application data being provided by said authenticator;
determining an application threshold value from a plurality of different application threshold values, each application threshold value being correlated with at least one of a plurality of authenticators and relating to a minimum required probability of requestor identification of the respective authenticator;
comparing the determined application threshold value with said user probability value; and
in case said user probability value corresponds to said application threshold value, transmitting user authentication information to said authenticator.

20. A non-transitory computer-readable medium including contents that are configured to cause an authentication server to conduct the method of claim 19.

21. An authentication server for a probability-based user authentication system, comprising at least
an authentication probability evaluation module for determining a probability of requestor identification; wherein
said authentication server is configured to at least receive an authentication request from an authenticator, said authentication request comprising at least user identification data; and
said authentication probability evaluation module is configured upon reception of said user identification data
to receive user behavior information from a user information database, which user behavior information corresponds to the received user identification data, and which user behavior information allows the determination of prior or past behavior of the requestor; and
to determine a user probability value, corresponding to a probability of requestor identification, said probability of requestor identification being based upon prior or past behavior of the requestor, said determination comprising comparing at least said user behavior information with authenticator application data, wherein
the authenticator application data is provided by said authenticator;
the user probability value is determined in dependence of the time passed since a successful prior user authentication; and
the requestor is authenticated in dependence of said determined user probability value.

22. The authentication server for a probability-based user authentication system according to claim 21, wherein the user probability value is determined by the authentication probability evaluation module so that an increased time passed since a successful prior user authentication provides a degraded user probability value.

\* \* \* \* \*